United States Patent
Mann

(10) Patent No.: US 11,608,015 B2
(45) Date of Patent: Mar. 21, 2023

(54) RV WASTEWATER TRANSPORT TANK

(71) Applicant: Michael Lewis Mann, Wetumpka, AL (US)

(72) Inventor: Michael Lewis Mann, Wetumpka, AL (US)

( * ) Notice: Subject to any disclaimer, the term of this patent is extended or adjusted under 35 U.S.C. 154(b) by 0 days.

(21) Appl. No.: 17/351,769

(22) Filed: Jun. 18, 2021

(65) Prior Publication Data

US 2022/0024392 A1 Jan. 27, 2022

Related U.S. Application Data

(63) Continuation of application No. 63/041,332, filed on Jun. 19, 2020.

(51) Int. Cl.
*B60R 15/04* (2006.01)

(52) U.S. Cl.
CPC .................. *B60R 15/04* (2013.01)

(58) Field of Classification Search
CPC ....................................... B60R 15/04
USPC ............................. 4/300, 321, 315
See application file for complete search history.

(56) References Cited

U.S. PATENT DOCUMENTS

| | | | |
|---|---|---|---|
| 4,222,130 A * | 9/1980 | Roberts | E03D 5/016 4/317 |
| 4,728,144 A * | 3/1988 | Crean | B60P 3/32 296/156 |
| 4,785,483 A * | 11/1988 | Wise | A47K 11/04 296/65.07 |
| 5,036,554 A * | 8/1991 | Blount | E03D 11/11 4/323 |
| 5,500,960 A * | 3/1996 | Tagg | E03D 5/01 4/318 |
| 5,913,610 A * | 6/1999 | Duck | E04H 1/1216 4/321 |
| 5,979,012 A * | 11/1999 | Fritz | B08B 3/026 15/321 |
| 6,129,117 A * | 10/2000 | Eriksson | B60R 15/00 137/899 |
| 6,598,242 B1 * | 7/2003 | Denome | A47K 11/00 137/899 |
| 6,721,967 B2 * | 4/2004 | Braxton | A47K 4/00 4/321 |
| 6,723,173 B1 * | 4/2004 | Golladay | A47K 11/00 134/21 |
| 7,192,060 B2 * | 3/2007 | Warrick | B60P 3/22 280/831 |
| 7,980,513 B2 * | 7/2011 | Hoffjann | B64D 11/02 244/136 |
| 8,927,265 B2 * | 1/2015 | Hansen | B09B 3/00 435/290.2 |
| 10,654,426 B1 * | 5/2020 | Keller | E03D 5/01 |

(Continued)

*Primary Examiner* — Lori L Baker

(57) ABSTRACT

A method and apparatus to fill, transport and discharge up to 50 or more gallons of waste water while the device remains in the bed of a pickup truck or like vehicle. Innovation is accomplished through the design of the waste water tank which incorporates a main body with a lower side mounted inlet/outlet port, and uniquely designed drain hose management structure comprising a friction grip trough and hose rest, with locking slots. Further innovation is achieved by a method of using the invention in the vehicle thus eliminating lifting and pulling a filled tank.

16 Claims, 10 Drawing Sheets

(56) References Cited

U.S. PATENT DOCUMENTS

| | | | |
|---|---|---|---|
| 2012/0167297 A1* | 7/2012 | Poust | E04H 1/1205 4/321 |
| 2013/0130346 A1* | 5/2013 | Hansen | B09B 3/00 435/167 |
| 2014/0215702 A1* | 8/2014 | Ito | E04H 1/1266 4/321 |
| 2017/0144713 A1* | 5/2017 | Li | B60P 3/38 |
| 2017/0361786 A1* | 12/2017 | Julian | E03D 7/00 |
| 2018/0202142 A1* | 7/2018 | Dainelli | B60P 3/2205 |
| 2019/0299838 A1* | 10/2019 | Heinonen | B60P 3/2215 |

* cited by examiner

RV WASTEWATER TRANSPORT TANK

CROSS REFERENCE TO RELATED APPLICATIONS

This non-provisional patent is cross-referenced to provisional application No. 63/041,332 Filing Date 19 Jun. 2020. First Named Inventor Michael Lewis Mann Customer Number 172095

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

Field of the Invention

System, Methods and Apparatus for a Truck Carry RV Waste Water Tank

The present invention is in the field of waste water (sewage or also referred to as black water and/or grey water) transport and discharge, and pertains particularly to methods and apparatus to fill, transport and discharge waste water such as RV waste water and/or portalet waste water.

Discussion of the State of the Art

Portable waste water transport tanks of different descriptions and manufacture are known in the art. They are commonly referred to as tote, tote tank, holding tank, portable waste transport tank or other similar name. There are in the present inventor's opinion shortcomings that give opportunity to improve the utility of such tanks.

The prevailing practice among RV'ers, when transporting waste water within a campground, is to utilize one of the above described portable tanks. These tanks are typically pulled by hand or attached to the bumper of a tow vehicle and towed to the campground's dump station. Portable waste water tanks for RVs are limited in capacity to typically 35 gallons or less weighing up to 290+/−pounds when full, which is practically the maximum capacity/weight that can be managed by an individual utilizing the process prescribed in the current art. Limited capacity is a significant inconvenience because more frequent trips are required to remove a given amount of waste water. When currently available tanks are attached to a tow vehicle they are awkward to manage because they necessarily have small wheels that are problematic on any terrain that is not smooth. They require the driver to proceed at slow speed to prevent the small "trailer" from bouncing or tipping over or otherwise becoming damaged due to the combination of high weight and relatively small wheels while in tow. Generally, this is a poor solution even when a dump station is available for use.

Another problem not addressed by the current art is the disposal of waste water when campers overnight in locations like parking lots and government lands. Often, dump stations are not conveniently available. When RV'ers dry camp or boon dock, the prevailing art provides no waste water transport system that will easily manage up to fifty or more gallons of waste water over highway distances with ease. One must tow their entire camper to a dump station to empty the holding tanks legally and without polluting the environment.

Therefore, what is clearly needed is a sewage transport tank that solves the above limitations.

BRIEF SUMMARY OF THE INVENTION

The inventor asserts that what is needed is a means of transporting waste water from an RV or like sanitary receptacle to an approved (either nearby or distant) dump station which eliminates the limitations of lifting or pulling a waste water tank with a system that provides for the tank to be placed and remain in the bed of the truck or tow vehicle and is capable of transporting greater capacities than what is currently offered. This system will utilize the design of the tank in a process which incorporates a macerator pump and other required smaller parts which are available from third party sources to lift the waste water from the RV waste water discharge point to the waste water transport tank. The method and apparatus will allow the user to change connections and parts alternating from the process of filling the tank, to storing the tank, to transporting the tank to draining the tank with easy twist on connections; and without the use of mechanical gates which are subject to leakage. The method of using as the invention is accomplished without the need of wheels or to remove the tank from the tow vehicle except for storage. Further, the design capacity of the tank shall be up to 50 gallons or more and capable of transporting up to 400 pounds or more of waste water. Whether RV'ing in a campground without sewer hookup, dry camping, or boon docking, the advantage and benefit of the current invention to easily transport 50 or more gallons of RV waste water to a nearby town or location with dump station facilities will be apparent to one knowledgeable in the field of the invention.

BRIEF DESCRIPTION OF THE SEVERAL VIEWS OF THE DRAWING

The novel features believed characteristic of the invention are set forth in the appended claims. The invention itself, however, as well as a preferred mode of use, and advantages thereof, will be best understood by reference to the following detailed description, an illustrative embodiment when read in conjunction with the accompanying drawings, wherein like reference numerals indicate like components, and:

DETAILED DESCRIPTION OF THE INVENTION

The inventor provides a unique method and apparatus for a truck carry, tank system which enables the user to transport waste water (gray water and black water) in greater volumes than currently possible in the art and to fill and discharge the tank with minimal effort and without tools. The new system incorporates the use of a macerator pump 205 to fill the tank and a unique trough 601 and hose rest with locking slots 602 molded into the tank body frontal portion 107 to facilitate changing connections and thusly the functions of the system components. The illustrated example is a molded plastic assembly, although the invention is not limited as to materials or techniques of fabrication.

Figure 1A:
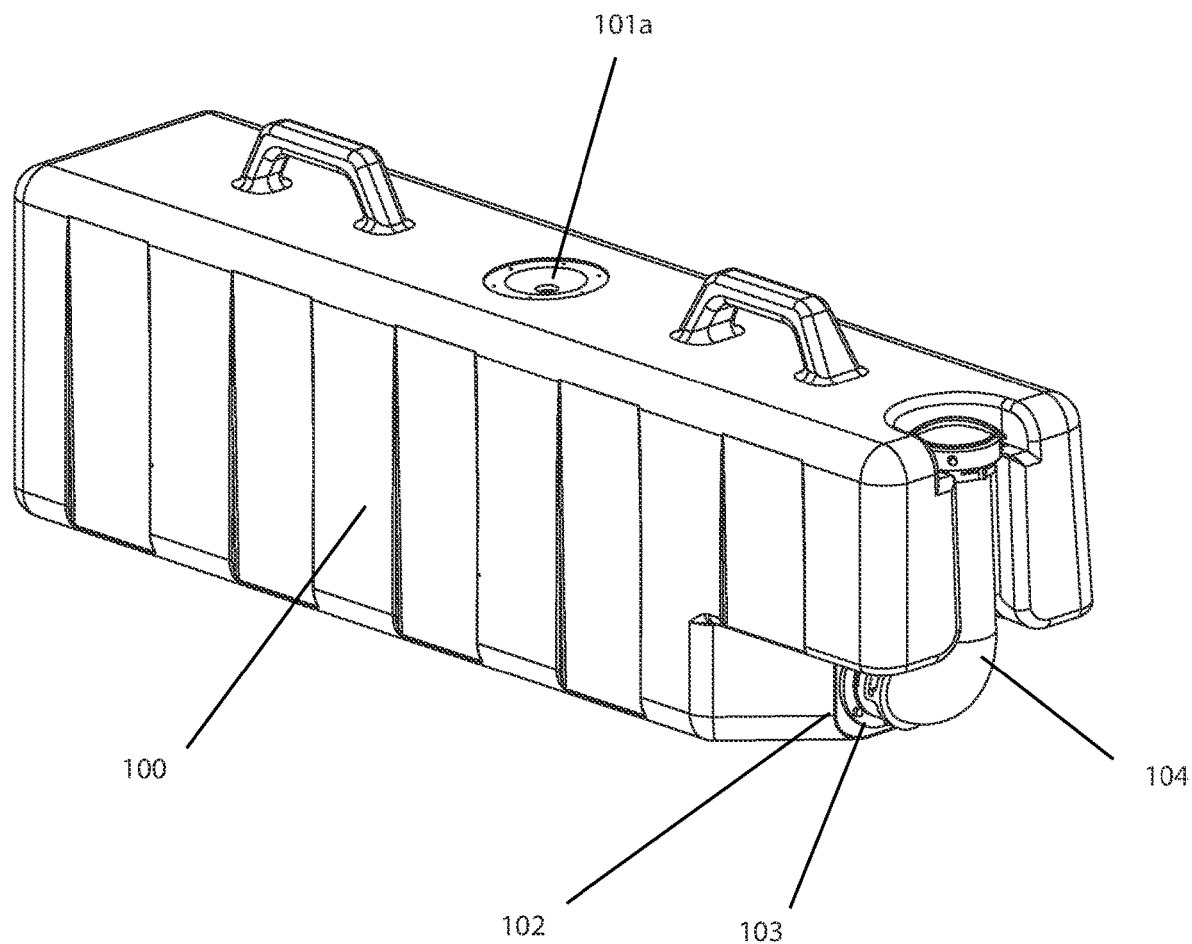
FIG. 1A is a 3D perspective view (without the vent) and FIG. 1B is a 1 dimensional exploded view of a preferred embodiment of the current invention.
Figure 1B:
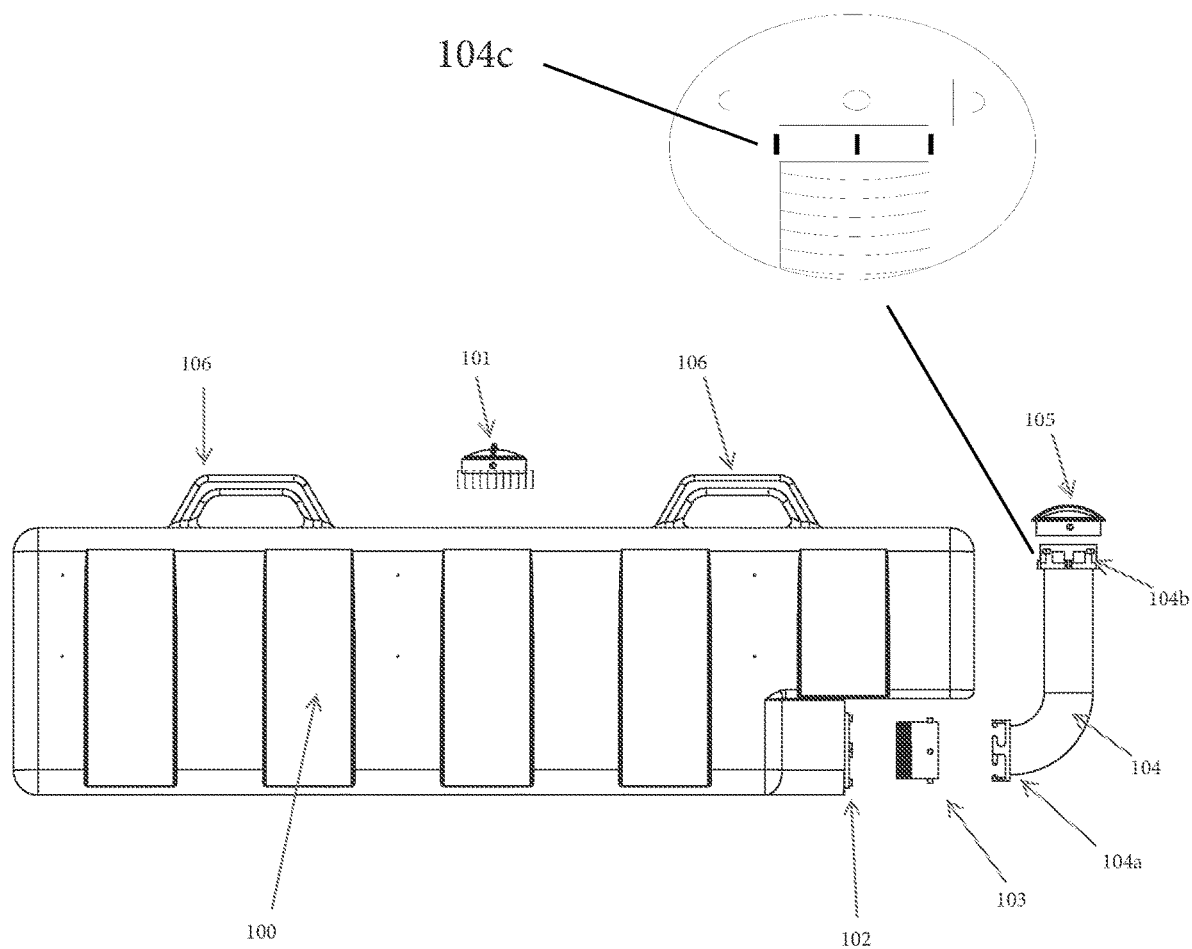
Figure 2:
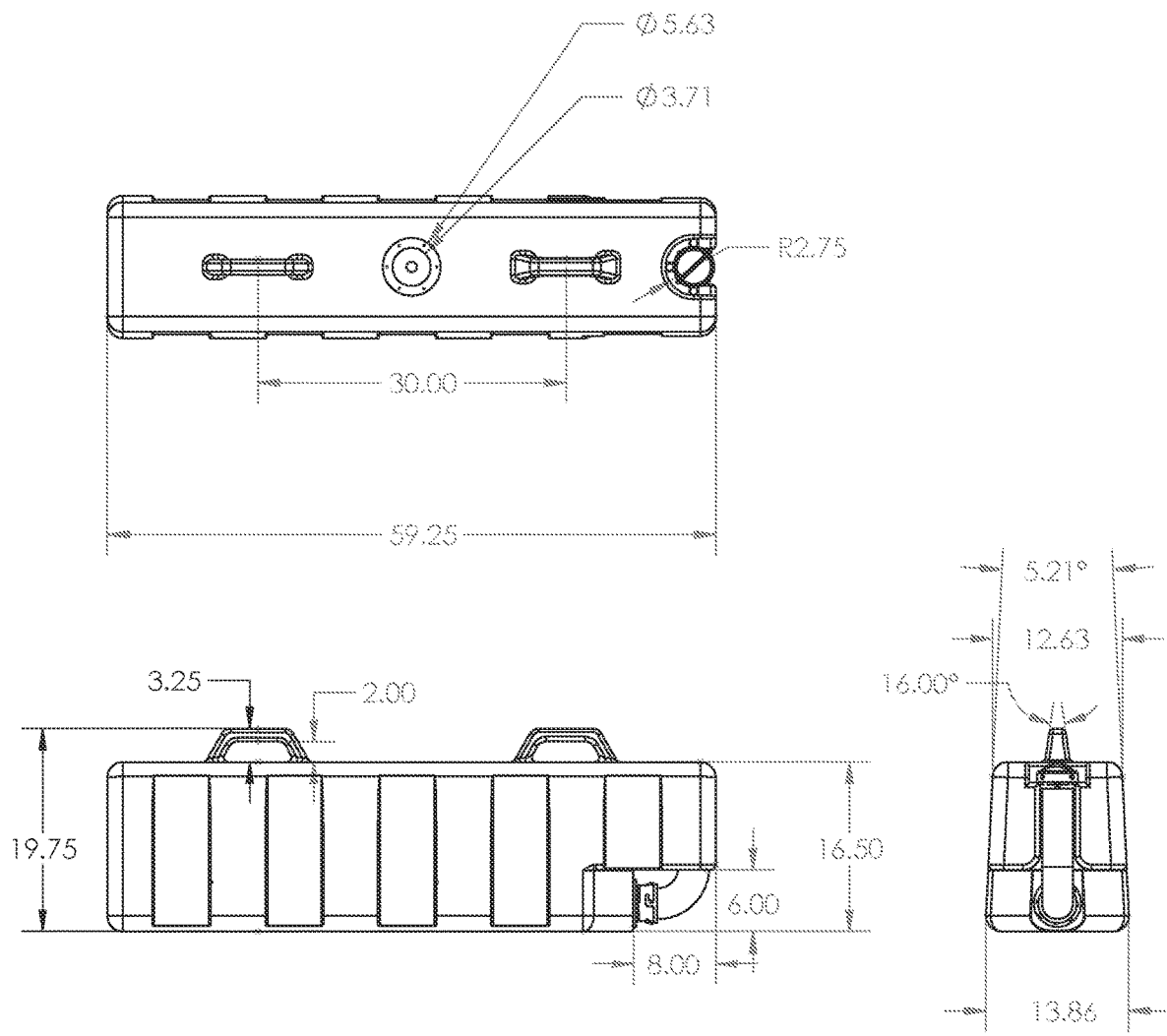
FIG. 2 is a dimensioned schematic diagram including several views of a preferred embodiment of the current invention.
Figure 3:
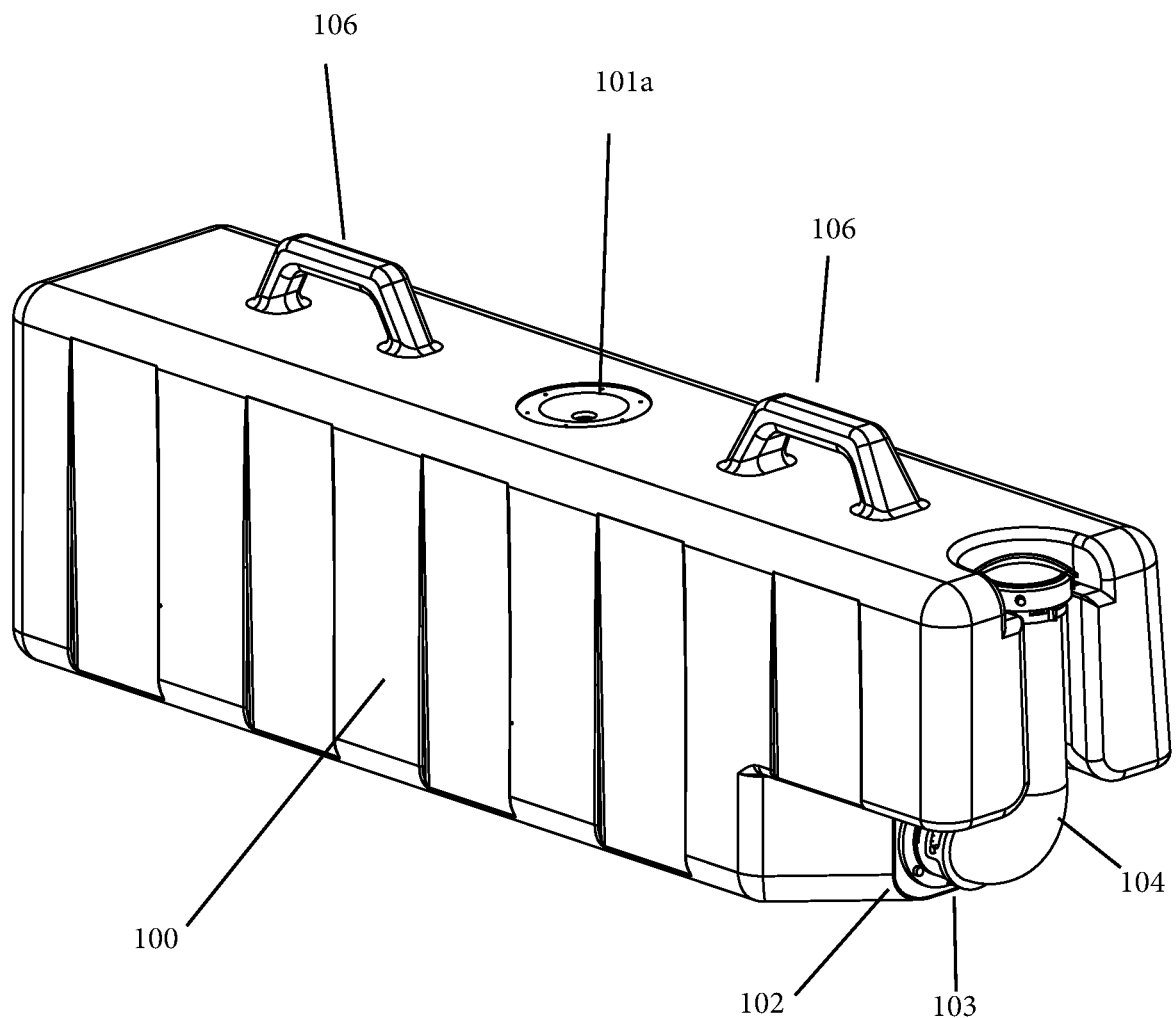
FIG. 3 is a 3D view showing the tank body with handles and assembled third party parts comprising a port member, threaded lug fitting, flexible hose and cap.
Figure 4:
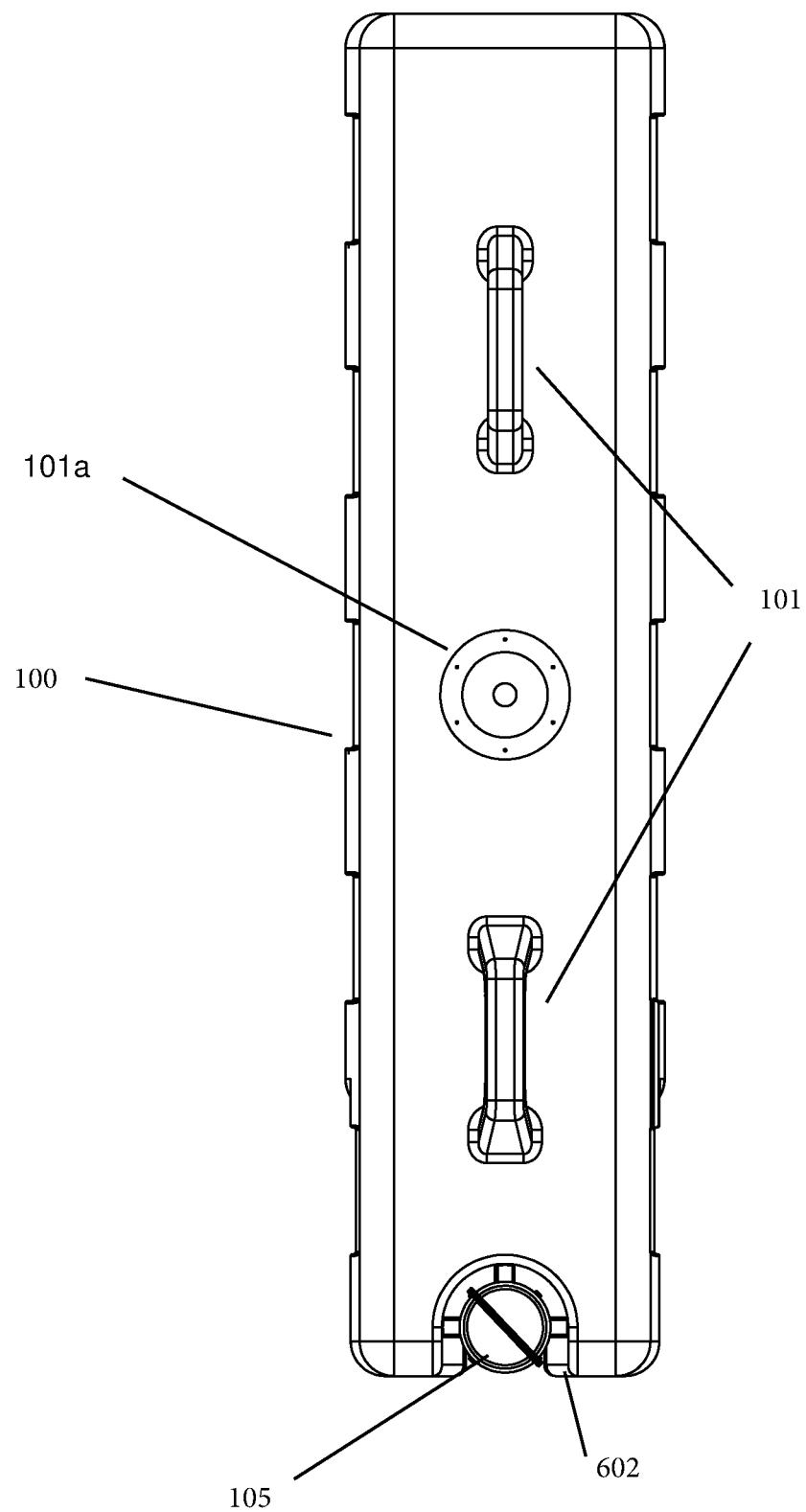
FIG. 4 is a top view showing the tank body with the cap on the hose in the resting position in the hose rest with locking slots.
Figure 5:
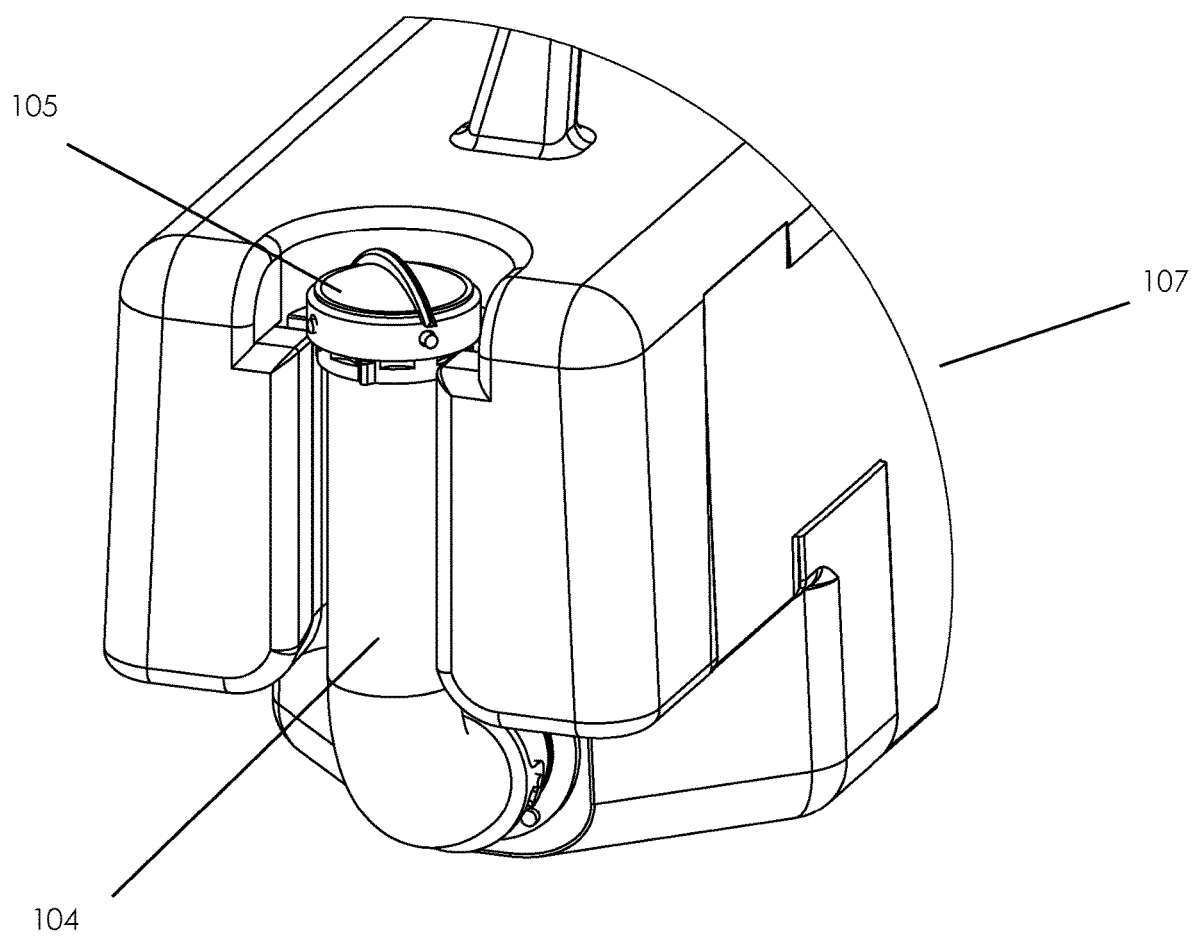
FIG. 5 is a detailed view of the trough channel with flexible hose and cap attached.
Figure 6:
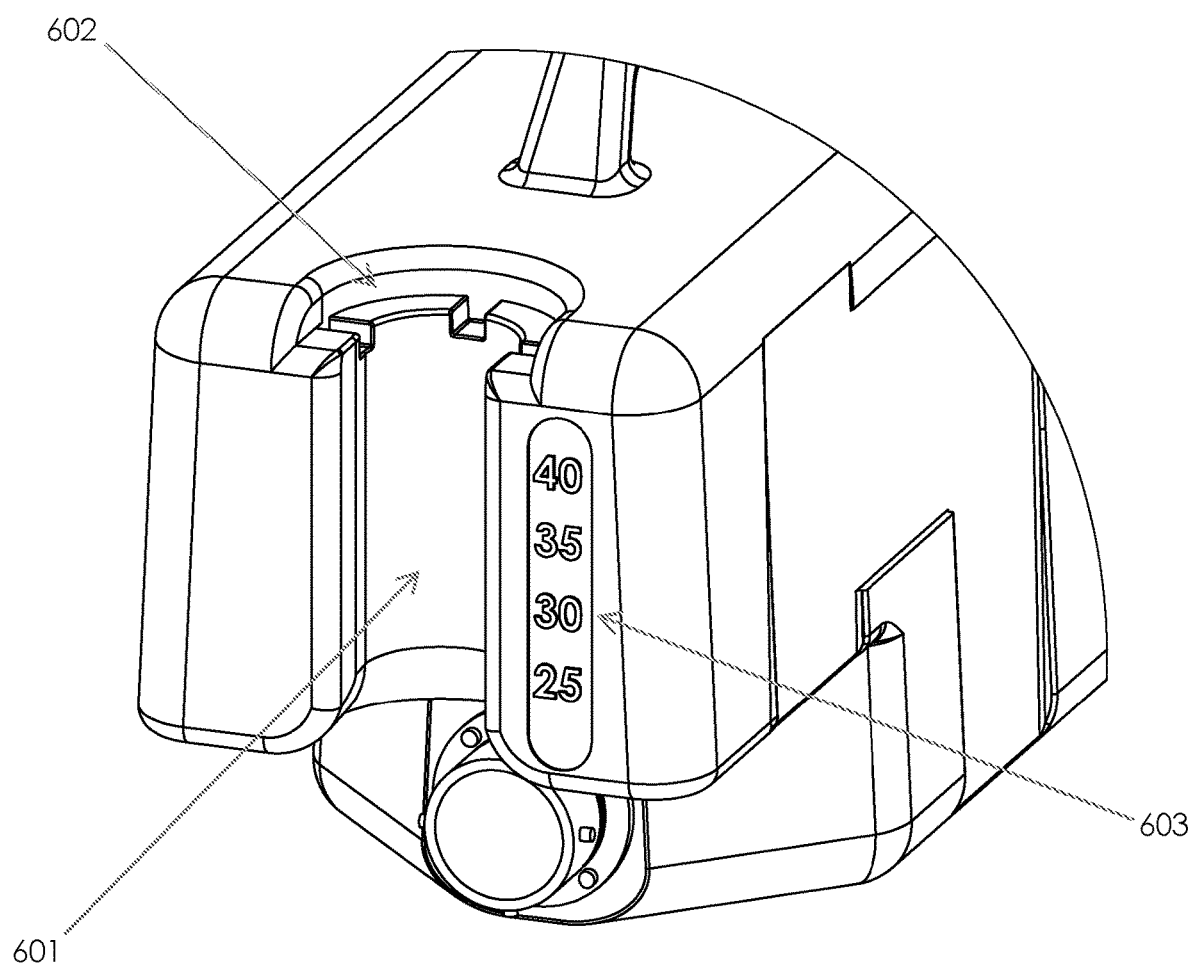
FIG. 6 shows the same perspective as FIG. 5 without the flexible hose and cap. This view details the hose rest with locking slots that prevent the flexible hose from rotating.

The present invention is described in enabling detail in the following examples, which may represent more than one embodiment of the present invention:

FIG. 1A, In this diagram, a 3D perspective view of the current invention is shown. The RV waste water transport system includes a tank body 100. The tank body 100 has a vent 101 connecting the tank body to the atmosphere. The vent 101 relieves pressure while the tank body 100 is being filled and relieves vacuum created when the tank body 100 is being drained. The tank body 100 might have baffles (not shown) to prevent waste water from sloshing or shifting of contents and preventing the tank body from shifting or tipping while in transit. A port member 102 is permanently attached to the base of the tank body 100 to which is attached a threaded lug fitting 103 which together constitute the inlet/outlet port of the tank body frontal portion 107. The flexible hose end 104a of the flexible hose 104 is permanently (except for maintenance or cleaning) twist locked to the lug fitting 103 with the flexible hose 104 secured in the trough 601 and the flexible hose end 104b resting in the hose rest with locking slots 602. A cap 105 is attached to the flexible hose end 104b. This illustration depicts the system when the tank is in transit or storage mode.

Figure 7:
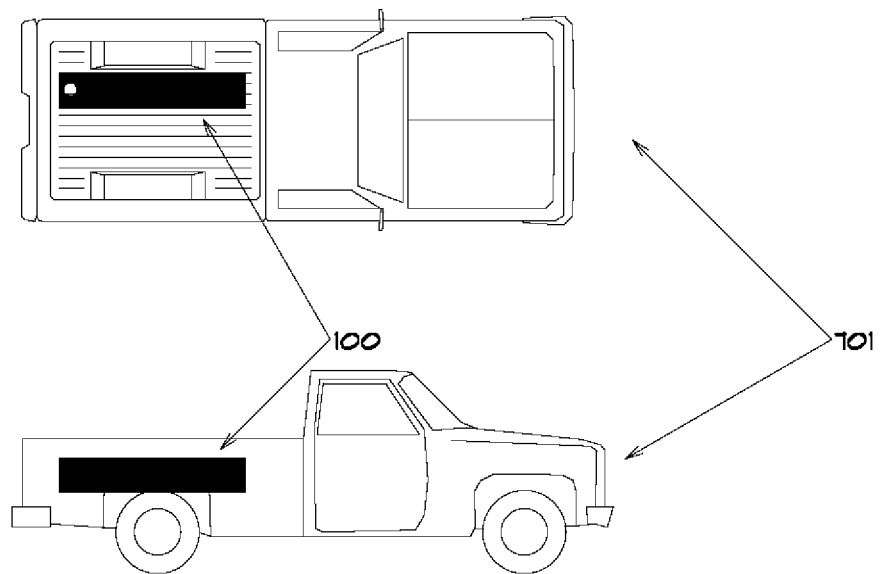
FIG. 7 Schematic Top view and side view waste water transport tank in transport configuration.

Referring to FIG. 7 the RV waste water transport tank is retained continually in the bed of the tow vehicle 701 for the duration of use. In the preferred application, the tank is placed against the left wheel well 702 of the tow vehicle 701. This places the tank nearest to the camper sewage discharge port when the tow vehicle 701 is backed to the camper 806. When arriving at a dump station 901, the tank will be in the optimal position to safely discharge.

Figure 8:
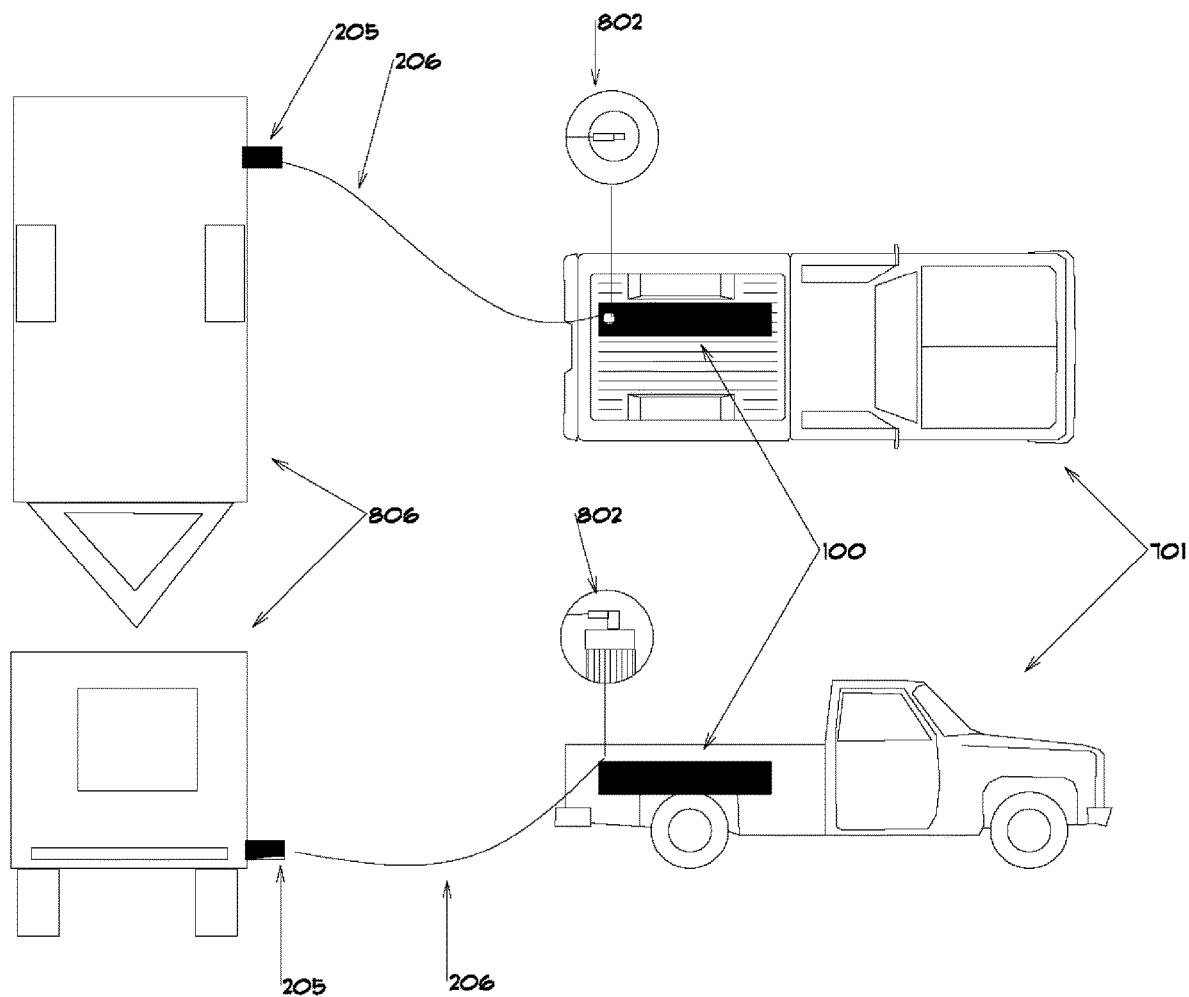
FIG. 8 Schematic diagram shows tank filling configuration, top and side views.

FIG. 8 shows the macerator pump 205 attached to the camper 806. The garden hose 206 connects the macerator pump 205 to the sewer hose adapter 802 which is twist locked to the flexible hose end 104b. When the macerator pump 205 is activated, the sewage transport tank body 100 and flexible hose are filled. The operator observes the fill scale 603 while also observing the level of fluid through the translucent tank body 100 in a preferred embodiment of the invention.

Figure 9:
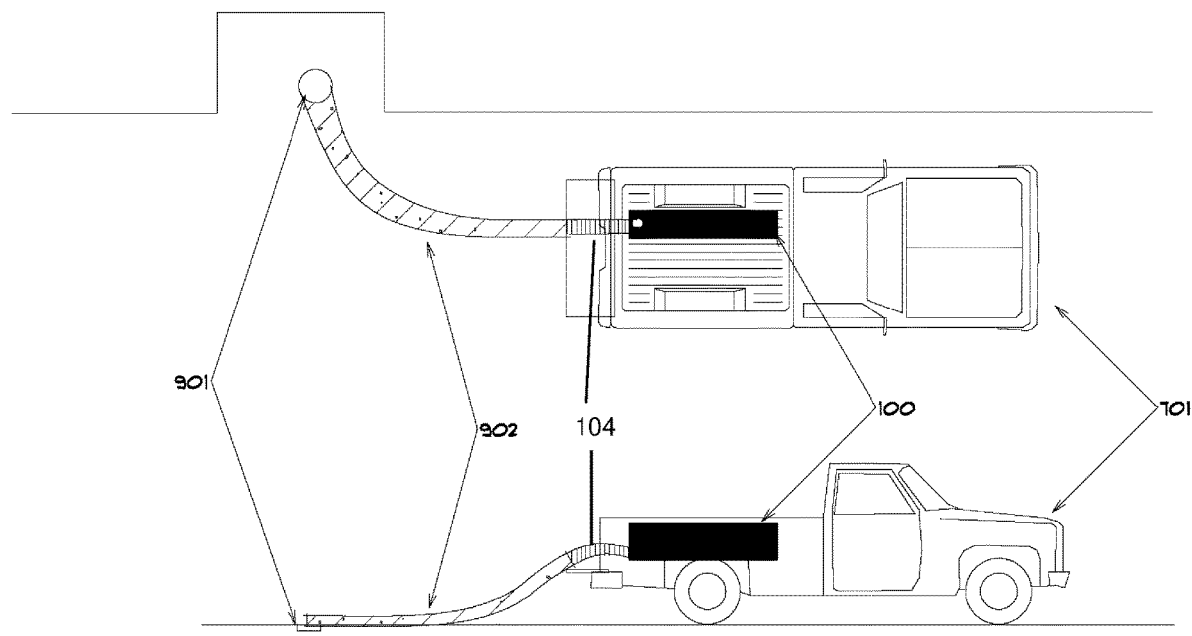
FIG. 9 Schematic diagram shows tank draining configuration, top and side views.

FIG. 9 Illustrates a top and side view as the system is configured to drain into a dump station 901. The connected flexible hose 104 and connected standard RV sewer hose 902 in this illustration have been removed from the hose rest with locking slots. This assembly is resting across the tow vehicle tail gate to allow the tank body 100 contents to flow into the dump station 901.

Prior designs connect directly to the RV sewer discharge port at an elevation below the discharge point and utilize gravity to fill the tank. Using the current invention to remove waste water from an RV, a macerator pump 205 must be connected to the sewage discharge port of the RV. Utilizing the macerator pump 205, waste water can be lifted to the bed of the truck which is higher than the RV sewage discharge port. Aside from the unique design of the tank body, the benefits of the invention are achieved with readily available aftermarket parts. The current invention accomplishes all of it's advantages because of the unique design of the tank body. The advantage to the current invention is that the tank body is maintained in the bed of the tow with the capability to accept up to fifty gallons RV waste water or more. Advantage is also achieved by utilizing the unique and innovative design of the tank body including the trough 601 and hose rest with locking slots 602. The trough 601 is designed and sized to provide a snug and secure cavity to accommodate the flexible hose. The hose end 104b is further stabilized and secured by the hose rest with locking slots 602. The hose rest with locking slots 602 limits the twisting of the upper hose end 104b by securing or "locking" the finger tabs 104c provided on the hose end 104b. This facilitates the attachment and removal of the sewer hose adapter 802 and the cap 105 and the standard sewer hose 902 when used at the/a dump station 901.

By removing the sewer hose adapter 802 from the flexible hose and attaching a cap 105 the tow vehicle 701 is now configured to transport the filled waste water transport tank. For discharging waste water from the tank body 100 and flexible hose 104, the cap 105 is removed and a standard RV sewage hose 902 is attached to extend the flexible hose 104 to a/the dump station 901. This hose configuration is then removed from the hose rest with locking slots 602 at the top of the frontal portion 107, draining the contents of the tank body 100 and flexible hose 104 into a dump station 901.

Stability of the waste water transport tank while is being transported is achieved by the presence of baffles (not shown) inside the tank body 100. Further stability is achieved by securing the tank handles 104 to the bed of the tow vehicle 701 by straps or ropes (not shown).

Tank body 100 has molded attachment points 108 for future accessory storage member to contain the standard RV sewer hose 902.

While the invention has been particularly shown and described with reference to the preferred embodiment thereof, it will be understood by those skilled in the art that the foregoing and other changes in form, methods and details may be made therein without departing from the spirit and scope of the invention.

What is claimed is:

1. A waste water transport tank in combination with a hose adapter, a garden hose, a macerator pump, a RV sewer hose and a tow vehicle/truck comprising:
    a tank body having;
    a capacity of 50 gallons or greater;
    a vent;
    a tank end having a frontal portion comprising;
    a port member, secured to said frontal portion; and
    a trough member molded to frontal portion of tank body; and
    a lug fitting secured to port member; and
    a flexible hose secured to lug fitting; and
    a cap on the upper end of the flexible hose; and a hose rest with locking slots molded to frontal portion of tank body, and whereby the user can transport waste water without attached wheels or attached pull or tow hardware which are subject to failure under loads, while accommodating increased volume of waste water and there is no need to lift or tilt tank body, or open or close gates or valves or vents to drain tank body.

2. The tank body of claim 1 wherein said tank body on its top side has a vent receptor.

3. The vent receptor of claim 2 wherein said vent receptor is concave with a 1 to 2 inch orifice which opens the tank body to the atmosphere and has 6 attachment points around it's outer edge; whereby the vent receptor and attached vent minimize the potential occurrence of spillage from the tank body.

4. The waste water transport tank of claim 1 wherein the said vent is continually open to the atmosphere, whereby said vent serves to relieve pressure when filling or break a vacuum when emptying said tank body, and whereby the vent does not have to be closed or opened by the user according to current function.

5. The waste water transport tank of claim 1 wherein said tank body has 2 molded handles on the top of tank body, whereby user can easily load and unload empty wastewater transport tank to and from tow vehicle/truck.

6. The waste water transport tank of claim 1 wherein the flexible hose fits snugly into the trough, whereby the trough helps to secure the flexible hose while filling or transporting the wastewater transport tank.

7. The waste water transport tank of claim 1 wherein the port member is a permanently secured, threaded spin fitting.

8. The waste water transport tank of claim 1 wherein the lug fitting is removably threaded to the port member.

9. The waste water transport tank of claim 1 wherein the flexible hose is a 2 ft. by 3 in. standard RV compartment hose.

10. The waste water transport tank of claim 1 wherein the hose rest with locking slots has an indented shelf with 3 slots which receive the finger tabs of the flexible hose, whereby the flexible hose is prevented from twisting when the user is attaching or detaching components, and whereby the flexible hose is supported and limited from falling below any liquid level in the tank body which would result in spillage.

11. The waste water transport tank of claim 1 wherein the frontal portion has a fill scale molded or printed on the side.

12. The waste water transport tank of claim 1 wherein the tank body is spin molded polyethylene and is translucent.

13. The waste water transport tank of claim 1 wherein the tank body has baffles, whereby the liquid contents are prevented from sloshing.

14. The waste water transport tank of claim 1 wherein the tank body has a capacity of 50 gallons or greater.

15. The waste water transport tank of claim 1 wherein the tank body has mounting points for an accessory storage container.

16. A method for transporting waste water comprising:

placing an RV waste water transport tank into a bed of a pickup truck/tow vehicle;

attaching a macerator pump to the RV;

connecting macerator pump to a garden hose;

connecting garden hose to a sewer hose adapter;

attaching sewer hose adapter to a flexible hose;

running the macerator pump thereby filling the tank body;

removing the sewer hose adapter;

affixing a cap;

transporting waste water transport tank to a dump station;

removing cap;

attaching a standard RV sewer hose;

placing the opposing end of the standard RV sewer hose into the/a dump station;

lowering the connected flexible hose and standard RV sewer hose from the hose rest with locking slots;

draining the tank body, and whereby the wastewater transport tank remains in the bed of the tow vehicle, saving the user from lifting a filled tank or risking broken wheels or being limited from using the macerator pump for other purposes, while still being able to transport a high volume of waste water and, whereby the wastewater transport tank is free from physical gates and barriers controlling waste water which may leak or otherwise malfunction.

* * * * *